J. A. HALL.
NUT LOCK.
APPLICATION FILED JULY 16, 1915.

1,188,447.

Patented June 27, 1916.

WITNESSES.
Clyde Nolan.
Come A. Griffin.

INVENTOR.
James A. Hall
By
Louis C. Vanderlip
Attorney.

UNITED STATES PATENT OFFICE.

JAMES A. HALL, OF LIBERTY MILLS, INDIANA.

NUT-LOCK.

1,188,447.  Specification of Letters Patent.  Patented June 27, 1916.

Application filed July 16, 1915. Serial No. 40,149.

*To all whom it may concern:*

Be it known that I, JAMES A. HALL, a citizen of the United States, residing at Liberty Mills, county of Wabash, and State of Indiana, have invented new and useful Improvements in Nut-Locks, of which the following is a specification.

My invention relates to improvements in nut locks and more especially to nut locks for use on fish-plates of rail joints, and the object thereof is the production of a simple, cheap and effective nut lock in the form of a single member which engages all of the nuts on the bolts of the fish-plate.

Figure 1:
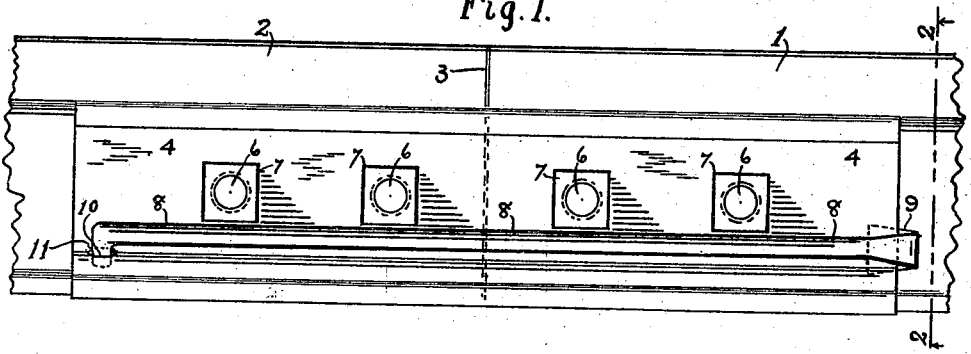
Figure 2:
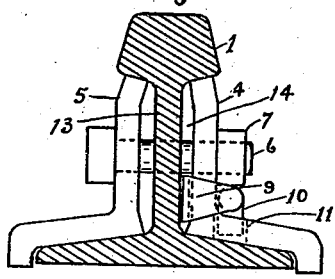
Figure 3:
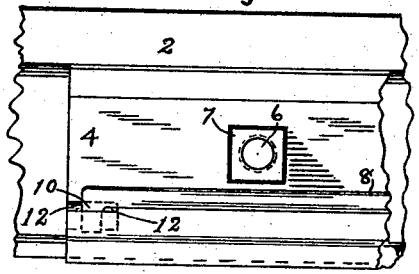
Figure 4:
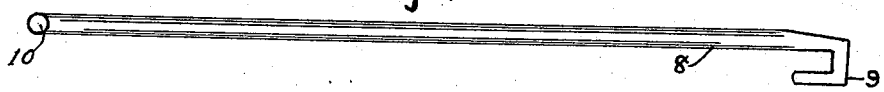

On the drawings, Figure 1 is a side elevation of a rail joint and fish-plate showing my invention in position; Fig. 2 is a section on the line 2—2 of Fig. 1; Fig. 3 is a fragment showing a modification of my invention; and Fig. 4 is a view of the locking rod with the hook in elevation.

Similar reference numerals refer to similar parts and members throughout the several views.

On the drawing, the numerals 1 and 2 designate the ends of rails abutting at 3 the ends of which are held together by the fish-plates 4 and 5 and the bolts 6, 6, and the nuts 7, 7.

The numeral 8 designates a locking rod provided on one end with the flattened hook 9 and the lateral projection 10 at its opposite end.

The numeral 11 designates an aperture, or recess, formed in the fish-plate 4 adjacent one end thereof, which may be drilled, rolled or stamped therein.

The numeral 12 designates an open notch formed in the fish-plate 4 at one end thereof, being shown in the modified form of my invention in Fig. 3, and may either extend entirely through the fish-plate body or partially therethrough, for the purpose herein described.

The numeral 13 designates the rail web and the numeral 14 indicates a cavity, or space, between the fish-plate 4 and the rail web 13.

The locking rod 8 is constructed of metal more or less resilient or springy, but may be made of malleable metal.

In practice, my invention is operated as follows. The nuts 7 are screwed on the bolts 6 tightly against the face of the fish-plate 4, leaving the upper and lower sides thereof substantially parallel with the tread of the rails 1 and 2. Thereupon, the hook 9 of the rod 8 is thrust into the cavity 14 and around the end of the fish-plate 4. The end of rod 8 carrying projection 10 is then bent upward slightly, the rod 8 is arranged below the nuts 7 and in contact therewith, and the projection 10 sprung into the recess 11, or the notch 12, according to the form used, both of which apertures are formed in the base portion of the fish-plate, to prevent lateral displacement of the rod 8. The rod 8 then lies substantially parallel with the side of each nut 7 and in contact therewith, and being unyielding, the nuts 7 cannot rotate against the rod 8, and become loose.

The projection 10 may be readily detached from the recess 11, or the notch 12, by the operation of any pointed instrument, and the rod 8 thereby removed from engagement with the nuts 7 and the fish-plate 4.

I claim:—

1. In combination with the fish-plates of a rail joint and the bolts and nuts thereof, one of said fish-plates being recessed adjacent one end thereof, a nut lock comprising a rod in engagement with the surface of each nut, said rod being provided with a hook at one end engaging the fish-plate end and provided also with a lateral projection at its opposite end, said projection being arranged within said fish-plate recess to prevent lateral displacement of the rod.

2. In combination with the fish-plates of a rail joint and the bolts and nuts thereof, one of said fish-plates being notched at one end thereof, a nut lock comprising a rod in engagement with the surface of each nut, said rod being provided with a hook at one end engaging the fish-plate end and provided also with a lateral projection at its opposite end, said projection being arranged within said fish-plate notch to prevent lateral displacement of the rod.

3. In combination with a plate, or member, penetrated by a plurality of bolts and the nuts for the bolts, said plate or member being recessed adjacent one end thereof, a nut lock comprising a rod in engagement with the surface of each nut, said rod being provided with a hook at one end engaging the fish-plate end and provided also with a lateral projection at its opposite end, said projection being arranged within said fish-plate recess to prevent lateral displacement of the rod.

4. In combination with a plate, or member, penetrated by a plurality of bolts and the nuts for said bolts, said plate or member being notched at one end thereof, a nut lock comprising a rod in engagement with the surface of each nut, said rod being provided with a hook at one end engaging the fish-plate end and provided also with a lateral projection at its opposite end, said projection being arranged within the fish-plate notch to prevent displacement of the rod.

5. In combination with the fish-plates of a rail-joint and the bolts and nuts thereof, one of said plates being provided with an aperture formed in the base portion thereof and penetrating the same from the upper to the under surface thereof, a nut lock comprising a rod in engagement with the surface of each nut, said rod being provided with a hook at one end engaging the fish-plate end, and provided also with a lateral projection at its opposite end adapted to be elevated and sprung into said aperture to prevent lateral displacement of the rod.

6. In combination with the fish-plates of a rail joint and the bolts and nuts thereof, one of said plates being provided with a notch in the base portion thereof and extending through the same from the upper to the lower surface thereof and open to one end of the fish-plate, a nut lock comprising a rod in engagement with the surface of each nut, said rod being provided with a hook at one end engaging the fish-plate end, and provided also with a lateral projection at its opposite end adapted to be elevated and sprung into said notch to prevent lateral displacement of the rod.

In witness whereof I have hereunto affixed my signature in the presence of two witnesses.

JAMES A. HALL.

Witnesses:
  CLINTON M. MARTIN,
  GEORGE L. FITCH.

Copies of this patent may be obtained for five cents each, by addressing the "Commissioner of Patents, Washington, D. C."